3,532,838
AUTOMATICALLY DISCONNECTING DIRECTION
INDICATOR SWITCH FOR MOTOR VEHICLES
Francesco Mollo, Via Torin 13, Turin, Italy
Filed July 9, 1969, Ser. No. 840,212
Claims priority, application Italy, July 27, 1968,
52,609
Int. Cl. H01h 3/16
U.S. Cl. 200—61.35                                    5 Claims

ABSTRACT OF THE DISCLOSURE

An automatically disconnecting direction indicator switch for motor vehicles, provided with magnets adhering to the steering column of the vehicle and permitting the movement of the steering column to be transmitted to a switch lever and also permitting the steering column to slip on the magnets when it is not necessary to transmit movement to the switch lever in the "off" or "on" position of the switch.

---

This invention relates to an automatically disconnecting direction indicator switch for motor vehicles.

The conventional direction indicator switches for motor vehicles have to be switched off manually by the driver after the vehicles has turned and is going straight again. In heavy city traffic the driver's attention is often distracted so that it often happens that he forgets to switch off the direction indicator when going straight again. This causes confusion and irritation to other drivers and often is the cause of accidents.

It is the object of the present invention to eliminate this inconvenience by providing a direction indicator switch which is switched off automatically by the return of the steering wheel to the normal position when the vehicle is going straight again after turning.

For this purpose the direction indicator switch according to the invention is provided with permanent or electromagnets which adhere to the steering column of the steering wheel of the motor vehicle and permit the movement of the steering column to be transmitted to a switch lever and also permit the steering column to slip on the magnets when it is not desired to transmit movement to the switch lever in the "off" or "on" position of the switch and when the switch is turned on manually and is to be kept in the "on" position.

More specifically the invention provides an automatically disconnecting direction indicator switch for motor vehicles, which comprises a steering column of ferrous material secured to a steering wheel, at least two magnets adhering to the steering column, a member of insulating material fixedly secured to the vehicle and having a radially projecting lug provided with a blind hole extending radially therein, said member being further provided with at least two radial recesses receiving the magnets so that they are to a limited extent shiftable therein, a pressure spring accommodated in the blind hole, a locating ball acted upon by the pressure spring, and a control lever of insulating material having an annular actuating portion provided in one of its surfaces with cavities for partly receiving the magnets and provided in its inside annular portion with a seat for the locating ball normally retained in the seat by the pressure spring.

Figure 1:
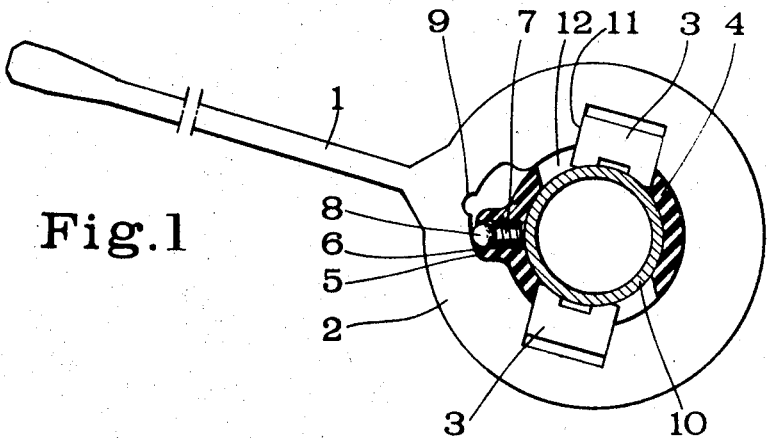
Figure 2:
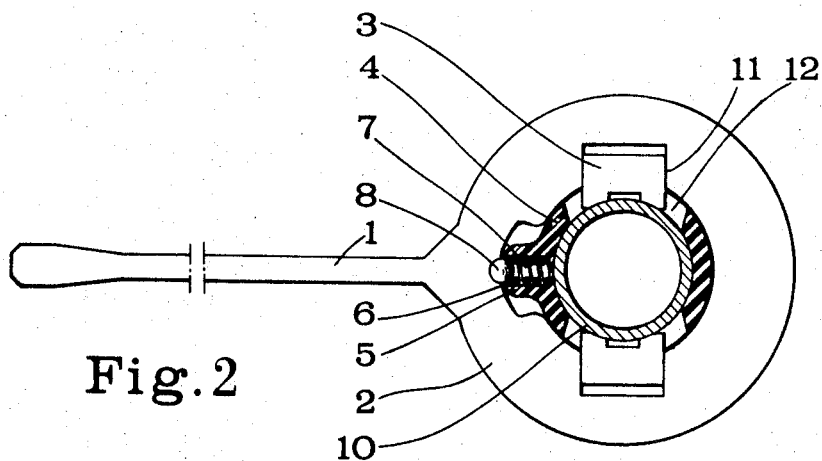

A preferred embodiment of the invention will now be described by way of example and with reference to the accompanying drawing, in which:

FIG. 1 is a schematic top plan view of a direction indicator switch according to the invention in the "on" position, and FIG. 2 is a similar view of the direction indicator switch in the "off" position.

Referring to FIG. 1, an automatically disconnecting direction indicator switch for motor vehicles according to the invention comprises a control lever 1 of insulating material, provided with an annular actuating portion 2 carrying on its rear side the electrical contacts and provided in one of its surfaces with cavities 11 for partly receiving at least two electromagnets or permanent magnets 3. A member 4 of insulating material is secured to the motor vehicle and has a radially projecting lug 5 provided with a radially extending blind hole 6 accommodating a pressure spring 7 urging a positioning or locating ball 8 outwardly into a seat 9 provided in the actuating portion 2 of the lever 1. The member 4 is further provided with at least two radial recesses 12 receiving the magnets 3 so that they are to a limited extent shiftable therein. A steering column 10 is firmly secured to the member 4 which forms part of the steering wheel of the vehicle. The steering column 10 engages the two electromagnets or permanent magnets 3 radially or axially.

The operation of the direction indicator switch is as follows:

FIG. 2 shows the switch in the "off" position. On turning the steering wheel and thus the steering column 10 to turn to the right or left with the vehicle, the magnets 3 which adhere to the steering column will receive a pushing force which will tend to rotate them, but for rotating they would also have to entrain the annular portion 2 of the lever 1, and this is not possible as the assembly is so designed that this energy is not sufficient to shift the ball 8 and compress the spring 7. Therefore, the steering column 10 will slide on the magnets 3 without moving them and the lever 1 will not leave its "off" position.

By shifting the switch manually to the "on" position for turning to the right, the ball 8 will leave its seat 9 and assume the position shown in FIG. 1. When now the steering column is turned in clockwise direction to turn to the right with the vehicle, the magnets 3 will receive a pushing force which tends to turn them in clockwise direction, but as the annular portion 2 of the lever 1, in which the magnets 3 are partly accommodated, can no longer turn in this direction since it abuts against the lug 5 of the member 4, the steering column 10 will slide on the magnets 3 without moving them. By turning the steering column in anticlockwise direction in returning the vehicle to the straight direction of travelling, the steering column 10 will entrain the magnets 3 and the annular portion 2 of the lever 1, in which they are partially accommodated, until the ball 8 returns to its seat 9 to return the lever 1 to its original position. For turning to the left the operations are the same.

With the use of electromagnets instead of permanent magnets they will be energized by means of contacts arranged at the back of the annular portion 2 of the lever 1 when the latter is manually actuated and when the lever 1 returns to the "off" position the feeding contact of the electromagnets is simultaneously opened.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. An automatically disconnecting direction indicator switch for motor vehicles, comprising:
   a steering column of ferrous material firmly secured to a steering wheel;
   at least two magnets adhering to the steering column;

a member of insulating material fixedly secured to the vehicle and having a radially projecting lug provided with a blind hole extending radially therein, said member being further provided with at least two radial recesses receiving said magnets so that they are to a limited extent shiftable therein;

a pressure spring accommodated in said blind hole and a locating ball acted upon by said pressure spring, and a control lever of insulating material having an annular actuating portion provided in one of its flat surfaces with cavities for partly receiving said magnets and provided in its inside annular portion with a seat for said locating ball normally retained in said seat by said pressure spring.

2. An automatically disconnecting direction indicator switch as claimed in claim 1, wherein said magnets are electromagnets.

3. An automatically releasable direction switch as claimed in claim 1, wherein said magnets are permanent magnets.

4. An automatically disconnecting direction indicator switch as claimed in claim 1, wherein said magnets radially engage said steering column.

5. An automatically disconnecting direction indicator switch as claimed in claim 1, wherein said magnets engage said steering column axially.

References Cited

UNITED STATES PATENTS

| | | | |
|---|---|---|---|
| 2,284,936 | 6/1942 | Wilshusen | 200—61.34 |
| 3,309,663 | 3/1967 | Curtindale | 340—55 |

ROBERT K. SCHAEFER, Primary Examiner

M. GINSBURG, Assistant Examiner